US010150559B2

(12) United States Patent
Sato et al.

(10) Patent No.: US 10,150,559 B2
(45) Date of Patent: Dec. 11, 2018

(54) UNMANNED FLYING OBJECT AND CONTROL DEVICE THEREFOR

(71) Applicants: Adtex Inc., Gunma (JP); Yokoyama Corporation, Gunma (JP)

(72) Inventors: Hiroo Sato, Gunma (JP); Yasumasa Uruta, Gunma (JP); Tsutomu Yokoyama, Gunma (JP)

(73) Assignee: Adtex Inc., Gunma (JP)

( * ) Notice: Subject to any disclaimer, the term of this patent is extended or adjusted under 35 U.S.C. 154(b) by 321 days.

(21) Appl. No.: 15/127,008

(22) PCT Filed: Apr. 18, 2015

(86) PCT No.: PCT/JP2015/061918
§ 371 (c)(1),
(2) Date: Sep. 16, 2016

(87) PCT Pub. No.: WO2016/170565
PCT Pub. Date: Oct. 27, 2016

(65) Prior Publication Data
US 2018/0170535 A1   Jun. 21, 2018

(51) Int. Cl.
*B64C 27/57*   (2006.01)
*B64C 27/08*   (2006.01)
(Continued)

(52) U.S. Cl.
CPC .............. *B64C 27/57* (2013.01); *B64C 27/08* (2013.01); *B64C 39/02* (2013.01); *B64C 39/024* (2013.01);
(Continued)

(58) Field of Classification Search
CPC ....... B64C 27/57; B64C 39/024; B64C 27/08; B64C 39/02; B64C 2201/042; B64C 2201/024; G08B 21/182
See application file for complete search history.

(56) References Cited

U.S. PATENT DOCUMENTS 9,139,310 B1 * 9/2015 Wang ...................... B64F 1/36
2018/0086472 A1 * 3/2018 Gore ..................... B64C 39/024
(Continued)

FOREIGN PATENT DOCUMENTS

JP   07-0174692   1/1995
JP   2006082774 A   3/2006
JP   2013079034 A   5/2013

*Primary Examiner* — Valentina Xavier
(74) *Attorney, Agent, or Firm* — Loginov & Associates, PLLC; William A. Loginov

(57) ABSTRACT

The present invention aims at solving the problem of providing a control device for an unmanned flying object that can elucidate the cause of a fault in the unmanned flying object after the fact and that has a function of desirably preventing a crash before it even happens, and at solving the problem of providing an unmanned flying object that incorporates such a control device. The control device of the present invention is a device for controlling a single rotor blade motor, and includes a calculation device, a storage device, a data output device, and a voltage detection device: the calculation device acquires and outputs information of various types; the storage device accumulates information of various types received from the calculation device; the data output device outputs information from the calculation device to an external control device; and the voltage detection device acquires voltage information from a battery or the like and supplies it to the calculation device.

9 Claims, 2 Drawing Sheets

(51) Int. Cl.
*B64C 39/02* (2006.01)
*G08B 21/18* (2006.01)

(52) U.S. Cl.
CPC ...... *G08B 21/182* (2013.01); *B64C 2201/024* (2013.01); *B64C 2201/042* (2013.01)

(56) References Cited

U.S. PATENT DOCUMENTS

| | | | |
|---|---|---|---|
| 2018/0134379 A1* | 5/2018 | Sugaki | B64C 27/08 |
| 2018/0203069 A1* | 7/2018 | Mori | G01R 31/36 |
| 2018/0204469 A1* | 7/2018 | Moster | G08G 5/0069 |
| 2018/0205242 A1* | 7/2018 | Kelly-Morgan | H02J 7/0021 |

* cited by examiner

UNMANNED FLYING OBJECT AND CONTROL DEVICE THEREFOR

FIELD OF THE INVENTION

The present invention relates to a control device for a rotor blade motor, and to an unmanned flying object that incorporates such a control device and that also incorporates a rotor blade.

BACKGROUND OF THE INVENTION

Recently, the development of unmanned flying objects such as drones and so on has progressed remarkably. As a typical such unmanned flying object, a multicopter having a plurality of rotor blades may be cited. For example, an unmanned flying object that has a plurality of rotor blades disposed at the ends of radially extending shafts may be considered. This type of unmanned flying object flies by causing the plurality of rotor blades to rotate simultaneously in good mutual balance. While such a flying object is flying, ascending or descending may, for example, be performed by increasing or decreasing the rotational speeds of the rotor blades, and moving forward or backward or the like may be performed by tilting the body of the object by varying the rotational speeds of the rotor blades. In the prior art, rotor blades of fixed pitch have often been used, and reaction due to their rotation is canceled out by arranging clockwise rotating rotor blades and anticlockwise rotating rotor blades alternately.

With regard to the balance of the plurality of rotor blades, normally, this is controlled by a single device provided for the unmanned flying object, this device being termed a flight controller. The rotational speeds and the directions of rotation of the rotor blades are determined by the flight controller, and the rotational speeds and the directions of rotation that have thus been determined are transmitted to the rotor blades. A control device is provided for each of the rotor blades, and supplies electrical power to a motor dedicated to that rotor blade. Commands for the rotational speeds and the directions of rotation of the rotor blades as determined by the flight controller are inputted to these control devices provided to the rotor blades, and thereby the power levels supplied to the rotor blades are determined so as to implement the abovementioned commands. In this manner, commands related to the rotation of each of the rotor blades are generated from the flight controller in consideration of the overall balance of the unmanned flying object, and these commands that have been generated are converted by the control devices provided for the rotor blades into supplies of power for each of the rotor blades.

SUMMARY OF THE INVENTION

Technical Problem

With an unmanned flying object, sometimes it may happen that the operation of the rotor blades may become unstable or the like, in which case an unexpected crash or loss of control may occur. In order yet further to improve the technology of unmanned flying objects, there is a requirement to ascertain the causes of such improper states, and to implement countermeasures against them. Moreover, in order to limit damage to people and/or to property associated with a crash to the minimum, when some moderate fault occurs, it is also desirable for it to be possible quickly to discover this fact, and to perform automatic operation so as to prevent a crash occurring, as far as possible. In consideration of the above, the problem that the present invention aims at solving is to provide a control device that can determine the cause of improper operation of an unmanned flying object after such a malfunction has occurred, and having a function of, desirably, preventing a crash before it even happens; and to provide an unmanned flying object equipped with such a control device.

Solution to Technical Problem

As a result of diligent investigations performed by the present inventors, the present invention has been formulated as detailed below.

[1] A control device for a rotor blade motor provided to an unmanned flying object that has a plurality of rotor blades, said control device being a device for controlling a single rotor blade motor, and comprising a calculation device, a storage device, a data output device and a voltage detection device, wherein:

the calculation device is adapted:

(A) to receive, from outside said control device, control details for the rotor blade motor that is to be controlled, to supply electrical power for implementing said control details to the rotor blade motor, and to accumulate in a storage device information relating to said electrical power that has been supplied;

(B) to receive voltage information from a voltage detection device and to accumulate said information in the storage device; and (C) to operate an output device for outputting desired information accumulated in the storage device to the exterior of the control device;

the storage device is adapted to accumulate the above described electrical power information and voltage information received from the calculation device;

the data output device is adapted to output information from the calculation device to the exterior of said control device; and the voltage detection device is capable of being connected to a power supply device external to said control device, and is adapted to acquire voltage information from said power supply device and to supply said voltage information to the calculation device.

[2] The control device of [1], further comprising an anomaly display device, and wherein the calculation device is adapted, when the voltage information received from the voltage detection device described above satisfies an anomaly condition that is determined in advance, to generate a signal and to send that signal to an anomaly display device so as to cause the anomaly display device to provide an anomaly display.

[3] The control device of [2], wherein in the above described case (A) the calculation device is adapted, when the voltage information received from the voltage detection device described above satisfies said anomaly condition that is determined in advance, to ignore the control details that are received and to supply an amount of electrical power that is determined in advance to the rotor blade motor.

[4] The control device of [2], further comprising a current detection device, and wherein: the current detection device is adapted to acquire the drive current of the rotor blade motor at predetermined time intervals, and to send data relating to said drive current to the calculation device; and the calculation device is adapted to accumulate said drive current data that has been received from the current detection device described above in the storage device, and, when the drive current data received from the current detection device described above satisfies an anomaly condition that is determined in advance, to generate a signal and to send that signal to an anomaly display device so as to cause the anomaly display device to provide an anomaly display.

[5] The control device of [4], wherein the calculation device is adapted, when the drive current data received from the current detection device described above satisfies said anomaly condition that is determined in advance, to ignore the control details that are received in the above case (A) and to supply to the rotor blade motor an amount of electrical power that is determined in advance.

[6] The control device of any of [2] to [5], further comprising a temperature detection device, and wherein:

the temperature detection device is adapted to acquire the temperature of the external air and/or the temperature in the neighborhood of the calculation device at predetermined time intervals, and to send data relating to said temperature to the calculation device; and the calculation device is adapted, when said temperature data received from the temperature detection device described above satisfies an anomaly condition that is determined in advance, to generate a signal and to send that signal to an anomaly display device so as to cause the anomaly display device to provide an anomaly display.

[7] The control device of [6], wherein the calculation device is adapted, when said temperature data received from the temperature device described above satisfies said anomaly condition that is determined in advance, to ignore the control details that are received in the above case (A) and to supply to the rotor blade motor an amount of electrical power that is determined in advance.

[8] The control device of any of [1] to [7], wherein the calculation device is further adapted (D) to accumulate the cumulative time of use of said control device, and, if said cumulative time of use exceeds a time period that is set in advance, not to supply electrical power to the aforementioned rotor blade motor when said rotor blade motor is stopped.

[9] An unmanned flying object comprising a plurality of rotor blades, and control devices according to any of [1] to [8], one of which is connected to each of said rotor blades.

Advantageous Effects of Invention

According to the present invention, since the data from the calculation device is accumulated in the storage device, accordingly, it is useful for subsequent fault mode analysis or the like, and moreover it is also simple and easy to extract this data via the data output device to an external data analysis means such as a personal computer or the like. According to a preferred aspect of the present invention, when an anomaly has occurred in the data, early resolution may be achieved by quickly displaying that abnormality; and, according to a further preferred aspect, by reducing the output level of the particular rotor blade during the anomalous situation to an extent that does not disturb the overall balance of the unmanned flying object, sudden crashing or control becoming impossible may be avoided to the greatest possible extent. And, according to yet another preferred aspect, the total time of use of this control device is recorded, and, when the service life of the control device is near, initiation of a new flight is prevented, so that, as a result, the danger that the control device may reach the end of its service life while flying is significantly reduced.

DETAILED DESCRIPTION

In the following, the present invention will be explained in detail with reference to the drawings as appropriate. The implementation shown in the figures is not to be considered as being limitative of the present invention, and is only given as an example.

Figure 1:
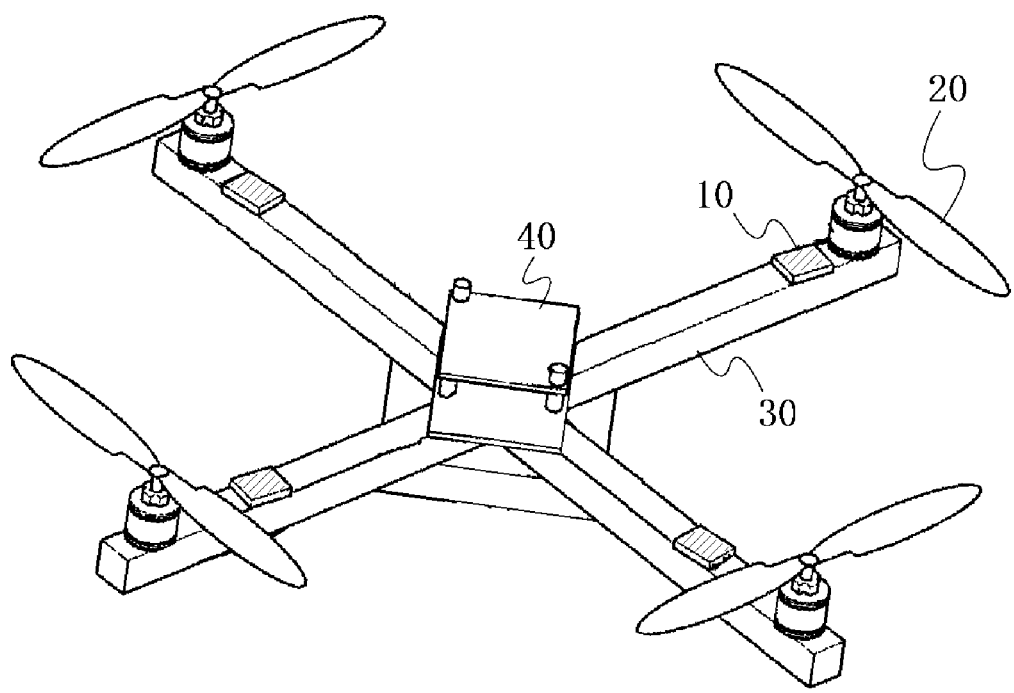
FIG. 1 is a schematic figure showing an example of the unmanned flying object of the present invention.

FIG. 1 is a schematic figure showing an example of the unmanned flying object according to the present invention. The unmanned flying object of the present invention is adapted to fly by remote control without any human being riding upon it, and comprises at least two rotor blades. With the present invention, it is supposed that the power source for the rotor blades is an electrical power source. Typically, this electrical power source may be a storage battery (not shown in the drawings) that is provided in the neighborhood of the rotor blades.

The unmanned flying object of FIG. 1 comprises four shafts 30 that extend radially from its center, rotor blades 20 one of which is provided at the end of each of the shafts 30, control devices 10 one of each of which is provided next to each of the rotor blades 20, and a flight controller 40 that is provided at the center. The structure of the unmanned flying object is not to be considered as being particularly limited, provided that it comprises a plurality of rotor blades. The number of shafts and rotor blades is desirably from four to ten.

The flight controller 40 determines the rotational speeds and the directions of rotation of the rotor blades 20 from one moment to the next. The rotational speeds and the directions of rotation of the rotor blades 20 are calculated by the flight controller 40 according to the desired direction of progression and the desired speed of the unmanned flying object. The rotational speeds and the directions of rotation of the rotor blades 20 that have been calculated by the flight controller 40 are transmitted to the corresponding rotor blades 20 from one moment to the next. This transmission is performed via the control devices 10, with the main function of the control devices 10 being to convert commands for the rotational speeds and the directions of rotation that have been calculated by the flight controller 40 into supplies of electrical power for the drive motors (not shown in the drawings) for the rotor blades 20. Exchanges between the flight controller 40 and the operator may be performed by remote actuation using electromagnetic waves such as radio waves or the like.

According to the present invention, the control devices 10 and the rotor blades 20 typically correspond to one another one-to-one. In concrete terms, a single control device 10 is provided for controlling a single rotor blade 20. The connections between the control devices 10 and the flight controller 40 and the connections between the control devices 10 and the rotor blades 20 are not to be considered as being particularly limited; communication cables or the like may be used, but these are not shown in the drawings.

Figure 2:
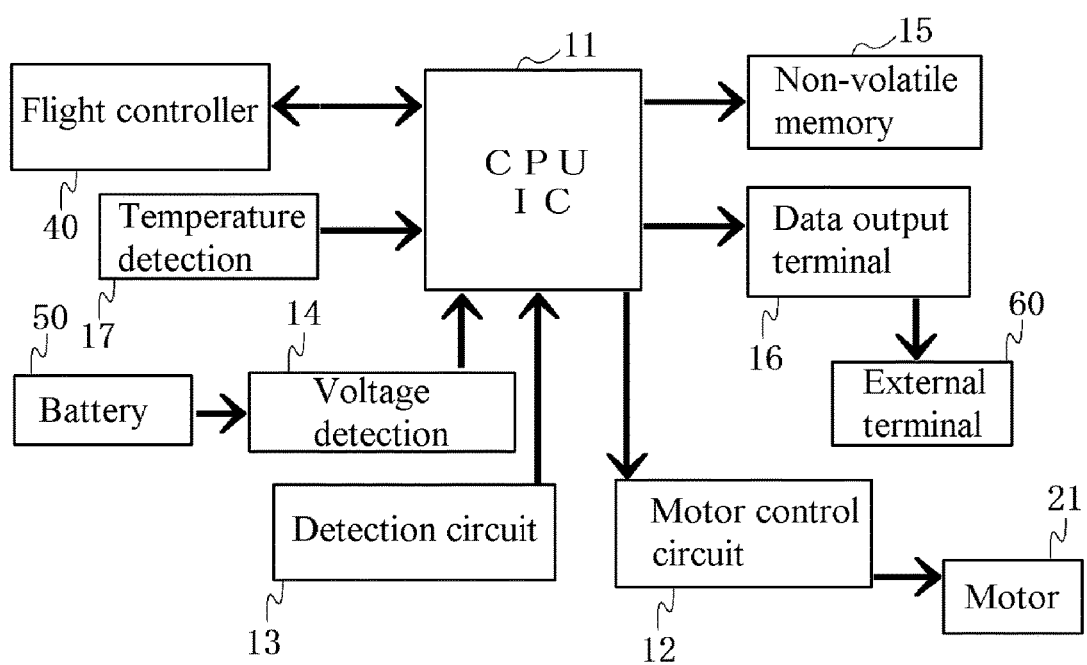
FIG. 2 is a schematic explanatory figure showing a control device of the present invention.

FIG. 2 is a schematic figure for explanation of a representative one of the control devices 10 of the present invention.

This control device 10 of the present invention is a calculation device. In FIG. 2, it is supposed that this calculation device is a CPU IC 11. Provided that the calculation device has the functions described below, its form is not to be considered as being particularly limited; it may be a CPU, an IC, an FPGA, an ASIC, or the like.

One function that the calculation device must fulfil is (A) to receive details of control for the rotor blade motor from the exterior of the control device 10, to supply electrical power to the rotor blade motor for implementing these control details, and to accumulate information relating to this electrical power that has been supplied in a storage device. The "rotor blade motor to be controlled" is the motor for driving the rotor blade 20 which is the object of control. The control details are commands as to how to drive this corresponding drive motor, and, in concrete terms, are the desired rotational speed and the desired direction of rotation of the rotor blade 20 and so on. In the FIG. 1 example, these control details are received from the flight controller 40. The meaning of "from the exterior of the control device 10" is that the flight controller 40 is provided exterior to the control device 10. It should be understood that, for the concrete details of the calculation for converting the control details for the rotor blade 20, such as rotational speed and direction of rotation, which may vary from moment to moment, into values for electrical power to be supplied to the drive motor, prior art technique such as motor control and so on may be referred to as appropriate.

According to the present invention, information relating to the electrical power levels supplied to the motors for driving the rotor blades 20 is accumulated in a storage device. This "information relating to electrical power" may be changes over time of the values of current and voltage supplied to the drive motors, and may also be information relating to the rotational speeds and the directions of rotation of the rotor blades 20. This information is desirably accumulated at predetermined intervals, for example every 1 to 5 seconds, in a storage device that will be described hereinafter.

Another function that the calculation device must fulfil is (B) to receive voltage information from a voltage detection device, and to accumulate that information in the storage device. Principally, this function consists of monitoring the voltage of a battery 50 (essentially, a storage battery) which is the power supply for the rotor blades 20. The voltage detection device can be connected to a power supply device (the battery 50 or the like) that is external to the control device 10, acquires voltage information from that power supply device (voltage detection 14), and supplies the voltage information that has thus been acquired to the calculation device. It is desirable for this supply of voltage information to be performed at predetermined time intervals, for example every 1 to 5 seconds. And it is desirable for the voltage values that have been detected to be accumulated in the storage device that will be described hereinafter. Reduction of the voltage value along with the consumption of electrical power from the battery 50 is checked, and thereby it is possible to estimate the remaining amount of power in the battery 50. Furthermore, if the battery 50 consists of an assembly of a plurality of unit cells, then the voltage value will abruptly drop if there is a fault with one or more of those unit cells. Accordingly an abrupt decrease in the voltage value strongly suggests the occurrence of a fault in a unit cell at that time point. When checking after a malfunction of the unmanned flying object, the voltage information data is helpful for ascertaining the time point that a cell unit has become faulty. For the concrete structure of the voltage detection device, a per se known technology such as a voltage measurement sensor or the like may be referred to as appropriate.

Yet another function that the calculation device must fulfil is (C) to operate an output device in order to output any desired information that has been accumulated in the storage device to the exterior of the control device described above. Information of various types is accumulated in the storage device, which as described above consists of the non-volatile memory 15 or the like. Another one of the functions that the calculation device must fulfil is to make it possible to extract that information from a data output terminal such as a USB terminal or the like, and to supply that information to an external terminal 60 such as a personal computer or the like.

Still another function that it is desirable for the calculation device to fulfil is (D) to accumulate the cumulative time of use of the control device 10 described above, and, upon initial supply of electrical power to the rotor blade motors described above when they are stopped, not to supply electrical power to the rotor blade motors described above if that cumulative time of use is greater than a time period that has been determined in advance. To put it briefly, this means that, if the service life of the control device 10 has been exceeded, then the start of a new flight is prohibited. The control device is equipped with various electronic components, and these all have service lives. There is a danger that the control device 10 will reach the end of its service life while the unmanned flying object is flying. As the "time period that has been determined in advance" for the cumulative time of use of the control device 10, for example, the time period obtained by subtracting the time during which the unmanned flying object can execute a single flight from the service life of the control device 10 may be suggested. If the cumulative time of use has exceeded the time period determined in this manner, then the starting of a new flight is prohibited. In concrete terms, supply of electrical power is not performed to any rotor blade motor that is stopped. It should be understood that it would not be appropriate to stop the supply of electrical power immediately while the unmanned flying object is flying even if the "time period that has been determined in advance" is exceeded, since this would invite a crash of the unmanned flying object. For circuitry for accumulating the cumulative time of use and for cutting off the supply of electrical power, a per se known technique related to circuit design may be referred to as appropriate.

The control device 10 includes a storage device. In the embodiment of the present invention shown in FIG. 2, the non-volatile memory 15 corresponds to that storage device. The storage device is adapted to accumulate the electrical power information and voltage information described above that has been received by the calculation device. For the concrete structure of the storage device and so on, a per se known technique related to memory storage may be referred to as appropriate. The "electrical power information" is information relating to the electrical power that has been supplied to the rotor blade motor; it would also be acceptable for this information to be converted into information relating to the rotational speed and to the direction of rotation of the rotor blade 20. Desirably, this information is accumulated as data at predetermined time intervals (for example, every 1 to 5 seconds). By referring to this data subsequently, it is possible to ascertain the actual state of the supply of electrical power to the rotor blades 20 at a specified flight time or at a specified time instant, and this may be useful in fault mode analysis, for example.

The "voltage information" is information related to the voltage values obtained by the voltage detection 14 of the battery 50. Desirably, this information relating to the voltage values is also accumulated as data at predetermined time intervals (for example, every 1 to 5 seconds). By referring to this data subsequently, it is possible to ascertain the state of the battery 50 (and in particular its fault state) at a specified flight time or at a specified time instant.

The control device 10 also comprises a data output device. This data output device may be, for example, a data output terminal 16 as exemplified by a USB terminal or the like. The data output device is adapted to output information from the calculation device to the exterior of the control device 10 described above. In concrete terms, "the exterior of the control device 10" means, for example, an external terminal 60 of a personal computer or the like. The data output device could operate via cable, or could operate via wireless. By passing via the data output device, data of various types acquired by the control device 10 or data of various types that has been accumulated in the storage device may be extracted to the exterior, and this can be helpful for investigation or the like when some failure has occurred.

Desirably, the control device 10 also includes an anomaly display device. In this case, when the voltage information received from the voltage detection device satisfies an anomalous condition that is determined in advance, the calculation device generates and outputs to the anomaly display device a signal that causes the anomaly display device to display the anomaly. As the "anomalous condition determined in advance", there may be cited, for example, a voltage value that indicates that the battery 50 is close to the end of its service life, or, for example, data that indicates that one or more of the plurality of unit cells has failed, i.e. that an abrupt voltage drop during a short time period has been observed, or the like. As the anomaly display device, for example, an LED may be illuminated, but this should not be considered as limitative.

When the voltage information that has been detected by the voltage detection device satisfies the "anomalous condition determined in advance" described above, it is desirable for the calculation device compulsorily to reduce the supply of electrical power to the rotor blade motors. In a state of affairs in which it is guessed that the battery is near the end of its service life or that a fault is occurring, it is considered that the minimum limit amount of electrical power necessary to prevent a crash should be supplied to the rotor blade motors, and that after some time the situation should be reviewed. It is desirable for the calculation device to be adapted so that, in this case, the control details received from the flight controller 40 are ignored, while amounts of electrical power that are determined in advance are supplied to the rotor blade motors. It may be supposed, for example, that this "amount of electrical power determined in advance" is an amount of electrical power for performing driving of the rotor blades 20 to the minimum limit at which a crash will not occur, or the like.

Desirably, the control device 10 also includes a current detection device. This current detection device acquires the drive current to the rotor blade motor at predetermined time intervals, for example every 1 to 5 seconds. Data for the drive current that has been acquired is sent to the calculation device. The current detection device may, for example, include a detection circuit 13, and detects the drive current to the rotor blade motor. Here, the calculation device operates so as to accumulate in the storage device the data for the drive current received from the current detection device. Furthermore, if the drive current data received from the current detection device satisfies an anomaly condition that is determined in advance, then the calculation device generates and sends a signal to the anomaly display device, so as to make the anomaly display device show an anomaly display. As this "anomaly condition that is determined in advance", for example, an anomalous current value that may occur when a portion of the rotor blade motor fails or the like may be suggested. Or it would also be possible to consider a case in which the average load current increases and decreases abnormally as being the "anomaly condition that is determined in advance". It would be possible to arrange for the anomaly display device described above that shows an anomaly of the battery 50 also to be employed as this anomaly display device; or a separate device may be employed.

When the drive current information that has been detected by the current detection device satisfies the "anomalous condition determined in advance" described above, it is desirable for the calculation device compulsorily to reduce the supply of electrical power to the rotor blade motor. In a state of affairs in which it is guessed that an anomaly of a rotor blade motor is occurring, it is considered that the minimum limit amount of electrical power necessary to prevent a crash should be supplied to that rotor blade motor, and that after some time the situation should be reviewed. It is desirable for the calculation device to be adapted so that, in this case, the control details received from the flight controller 40 are ignored, while an amount of electrical power which is determined in advance is supplied to the rotor blade motor. It may be supposed, for example, that this "amount of electrical power determined in advance" is an amount of electrical power for performing driving of the corresponding rotor blade 20 to the minimum limit at which a crash will not occur, or the like.

Desirably, the control device 10 also includes an temperature detection device 17. Such a temperature detection device 17 acquires the temperature of the external air, or the temperature in the neighborhood of the control device 10, or both of those, at predetermined time intervals, for example every 1 to 5 seconds. Data relating to the acquired temperature or temperatures is sent to the calculation device. For the concrete structure of the temperature detection device, a per se known technology such as a temperature observation means or the like may be referred to as appropriate. The "temperature in the neighborhood of the control device" is acquired with the objective of monitoring thermal runaway and so on of the CPU or the motor control circuit incorporated in the device, and it is very important to measure the temperature in a neighborhood that is suitable for this objective; in concrete terms, for example, the temperature of the CPU or of the motor control circuit may be suggested. Here, desirably, the calculation device operates so as to accumulate in the storage device the temperature data received from the temperature detection device. If the data relating to temperature received from the temperature detection device 17 satisfies the anomaly condition that is determined in advance, then the calculation device generates and outputs to the anomaly display device a signal that causes the anomaly display device to display an anomaly. As the "anomaly condition that is determined in advance", for example, an anomalously high value or an anomalously low value for the external air temperature, or a high temperature in the neighborhood of the calculation device that may be expected to cause a fault in the calculation device or the like may be suggested. It would be possible to arrange for the anomaly display device that shows an anomaly of the other information described above (the current, the voltage, and so on) also to be employed as this anomaly display device; or a separate device may be employed.

When the temperature information that has been detected by the temperature detection device 17 satisfies the "anomalous condition determined in advance" described above, it is desirable for the calculation device compulsorily to reduce the supply of electrical power to the rotor blade motor. In a state of affairs in which it is guessed that the external air temperature is anomalously hot or that thermal runaway of the calculation device may occur, it is considered that the minimum limit amount of electrical power necessary to prevent a crash should be supplied to the rotor blade motor, and after some time the situation should be reviewed. It is desirable for the calculation device to be adapted so that, in this case, the control details received from the flight controller 40 are ignored, while an amount of electrical power that is determined in advance is supplied to the rotor blade motor. It may be supposed, for example, that this "amount of electrical power determined in advance" is an amount of electrical power for performing driving of the rotor blade 20 to the minimum limit at which a crash will not occur, or the like.

An unmanned flying object that is equipped with a control device 10 as described above is also an aspect of the present invention. Here, the control devices 10 and the rotor blades 20 typically correspond to one another on a one-to-one basis. In concrete terms, a single control device 10 is provided for controlling a single rotor blade 20.

It would also be possible for the unmanned flying object to be provided with a GPS device. And the unmanned flying object could also have a "home function". Such a "home function" is a function with which the location of "home" is set and determined in advance, and with which, upon receipt of a return command to go "home", the unmanned flying object automatically goes to that "home" location.

INDUSTRIAL APPLICATION

According to the present invention, after having accumulated data of various types during the flight of an unmanned flying object, when a malfunction has occurred, it is simple and easy to perform subsequent investigation, and this contributes greatly to improvement of the unmanned flying object. Moreover, when anomalous data has been detected, unexpected crashing may be prevented by compulsorily driving only the corresponding rotor blade to rotate only at low load, and it may be anticipated that this will lead to damage to people or to property being kept to the minimum level.

REFERENCE SIGNS LIST

10: control device
20: rotor blade
30: shaft
40: flight controller

The invention claimed is:

1. A control device for a rotor blade motor provided to an unmanned flying object that has a plurality of rotor blades, said control device being a device for controlling a single rotor blade motor, and comprising a calculation device, a storage device, a data output device and a voltage detection device, wherein:
   the calculation device is adapted:
      (A) to receive, from outside said control device, control details for the rotor blade motor that is to be controlled, to supply electrical power for implementing said control details to the rotor blade motor, and to accumulate in a storage device information relating to said electrical power that has been supplied;
      (B) to receive voltage information from a voltage detection device and to accumulate said information in the storage device; and
      (C) to operate an output device for outputting desired information accumulated in the storage device to the exterior of the control device;
   the storage device is adapted to accumulate the above described electrical power information and voltage information received from the calculation device;
   the data output device is adapted to output information from the calculation device to the exterior of said control device; and
   the voltage detection device is capable of being connected to a power supply device external to said control device, and is adapted to acquire voltage information from said power supply device and to supply said voltage information to the calculation device.

2. The control device of claim 1, further comprising an anomaly display device, and wherein the calculation device is adapted, when the voltage information received from the voltage detection device described above satisfies an anomaly condition that is determined in advance, to generate a signal and to send that signal to an anomaly display device so as to cause the anomaly display device to provide an anomaly display.

3. The control device of claim 2, wherein in the above described case (A) the calculation device is adapted, when the voltage information received from the voltage detection device described above satisfies said anomaly condition that is determined in advance, to ignore the control details that are received and to supply an amount of electrical power that is determined in advance to the rotor blade motor.

4. The control device of claim 2, further comprising a current detection device, and wherein:
   the current detection device is adapted to acquire the drive current of the rotor blade motor at predetermined time intervals, and to send data relating to said drive current to the calculation device; and
   the calculation device is adapted to accumulate said drive current data that has been received from the current detection device described above in the storage device, and, when the drive current data received from the current detection device described above satisfies an anomaly condition that is determined in advance, to generate a signal and to send that signal to an anomaly display device so as to cause the anomaly display device to provide an anomaly display.

5. The control device of claim 4, wherein the calculation device is adapted, when the drive current data received from the current detection device described above satisfies said anomaly condition that is determined in advance, to ignore the control details that are received in the above case (A) and to supply to the rotor blade motor an amount of electrical power that is determined in advance.

6. The control device of claim 2, further comprising a temperature detection device, and wherein:
   the temperature detection device is adapted to acquire the temperature of the external air and/or the temperature in the neighborhood of the calculation device at predetermined time intervals, and to send data relating to said temperature to the calculation device; and
   the calculation device is adapted, when said temperature data received from the temperature detection device described above satisfies an anomaly condition that is determined in advance, to generate a signal and to send that signal to an anomaly display device so as to cause the anomaly display device to provide an anomaly display.

7. The control device of claim 6, wherein the calculation device is adapted, when said temperature data received from the temperature device described above satisfies said anomaly condition that is determined in advance, to ignore the control details that are received in the above case (A) and to supply to the rotor blade motor an amount of electrical power that is determined in advance.

8. The control device of claim 1, wherein the calculation device is further adapted (D) to accumulate the cumulative time of use of said control device, and, if said cumulative time of use exceeds a time period that is set in advance, not to supply electrical power to the aforementioned rotor blade motor when said rotor blade motor is stopped.

9. An unmanned flying object comprising a plurality of rotor blades, and control devices according to claim 1, one of which is connected to each of said rotor blades.

* * * * *